United States Patent Office 3,340,785
Patented Sept. 12, 1967

3,340,785
AUTOMATIC DIAPHRAGM-SETTING DEVICE
Karl Adler, Grenchen, and Georges Ducommun, Feldbrunnen, Switzerland, assignors to Biviator S.A., Geneva, Switzerland
Filed Oct. 28, 1964, Ser. No. 407,151
Claims priority, application Switzerland, Nov. 2, 1963, 13,478/63
9 Claims. (Cl. 95—10)

ABSTRACT OF THE DISCLOSURE

An automatic diaphragm-setting device in a camera, including a diaphragm-setting motor controlled by a transistorized bridge, the bridge transistors being individually controlled by the voltage difference of a reference source and a photoelectric cell.

This invention relates to an automatic diaphragm-setting device in a camera, comprising a reversible motor for setting the diaphragm and means for control of said motor.

Attempts have already been made to directly actuate an electro-mechanical control system for the diaphragm of a photographic or cinematographic camera by the photoelectric energy produced by one or more photoelectric cells exposed to and measuring the available illumination. However, it proved to be impossible to obtain sufficiently rapid and accurate setting of the diaphragm with a battery of photoelectric cells of reasonable size. For these reasons automatic diaphragm-setting devices have also been proposed wherein the photoelectric control energy produced by a measuring photoelectric cell is amplified by means of a transistor amplifier. However, insufficient accuracy is obtained with a simple amplifier due to the low temperature stability of the amplifier. Temperature compensation by means of a bridge amplifier or push-pull D.C. amplifier is possible, but high costs with comparatively low output power are the drawbacks of such systems. Another prior diaphragm setting device comprises a spring and a non-reversible motor acting onto the diaphragm-setting mechanism in opposite direction. However, the difficulties mentioned above regarding temperature stabilization of the amplifier are not overcome with this system and the static error is excessively high.

This invention aims at a diaphragm-setting device avoiding the drawbacks of the above prior systems and having high sensitivity, efficiency and setting speed. The automatic diaphragm setting device according to the present invention is broadly characterized in that the said motor is connected to the output terminals of a bridge circuit, all branches of the bridge circuit including electronic circuit elements, each of such electronic circuit elements being controlled independently of the others by differential signals produced in accordance with the diaphragm setting and the illumination.

This bridge circuit acts as a current reverser of very high sensitivity and very small static error and having an output power sufficient for a rapid setting of the diaphragm. In order to increase the sensitivity of the bridge circuit a switching transistor may preferably be connected into each branch of the bridge, each of said switching transistors being directly coupled with an amplifying transistor controlled by the said differential signals, whereby complementary transistors are preferably used for each pair of a switching transistor and amplifying transistor.

One embodiment of the invention is schematically illustrated, by way of example, in the attached drawing, wherein.

Figure 1:
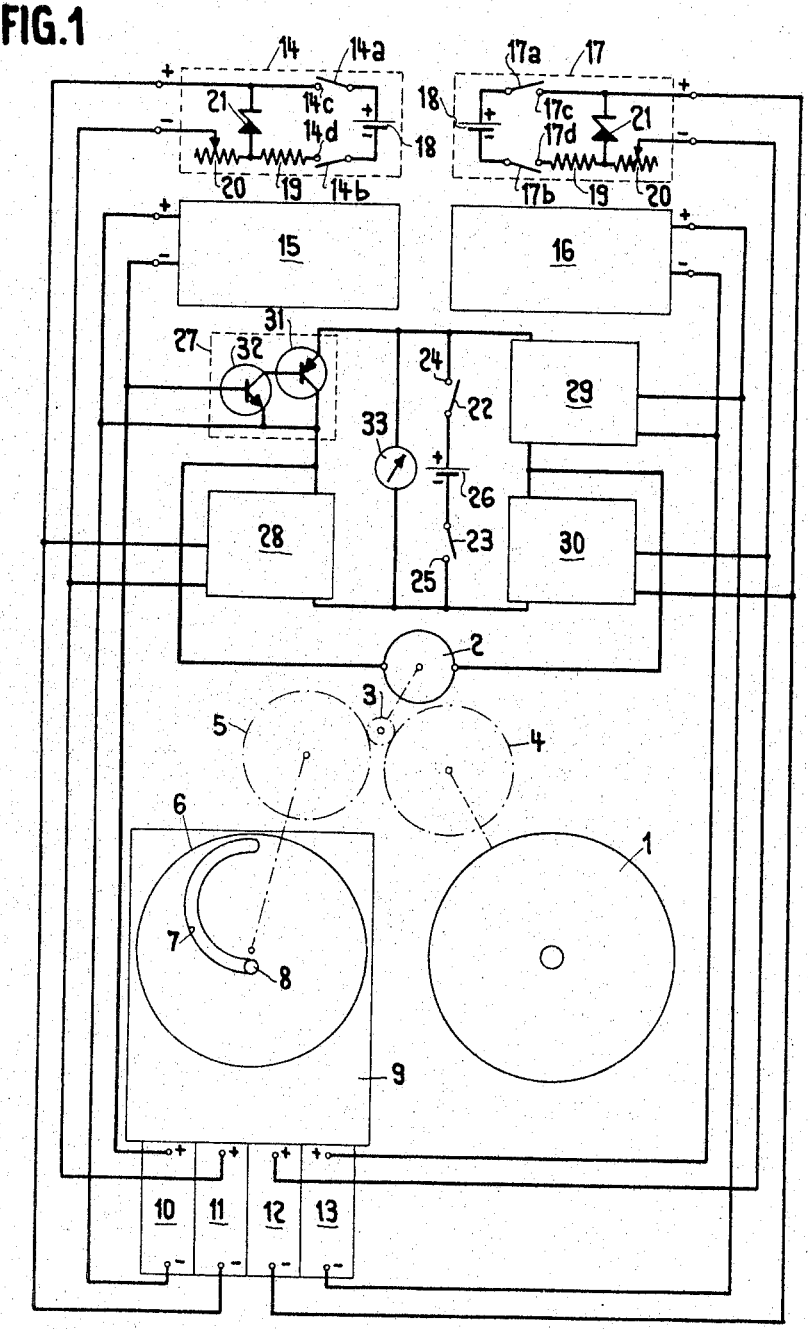
FIG. 1 is a circuit diagram of the diaphragm-setting device.

The diaphragm ring 1 of the camera, only schematically shown in FIG. 1, may be rotated by a governor motor 2 through a pinion 3 and a toothed wheel which may be a toothed ring fixed to the diaphragm ring 1. The motor 2 is a direct current motor with a permanent magnet field, the rotating direction of this motor being reversible by changing the direction of current flow in the armature of the motor. The pinion 3 of motor 2 gears with another toothed wheel 5 interconnected with a disc 6. Upon rotation of the motor 2 the disc 6 is rotated through pinion 3, gear wheel 5 and the shaft interconnecting the wheel 5 with disc 6 and schematically shown in FIG. 1. Disc 6 has a substantially spiral-shaped slit 7. A drive pin 8 fixed in an auxiliary diaphragm 9 of rectangular shape engages the slit 7 of the disc 6. Diaphragm 9 may be displaced in vertical direction along guide rails not shown in the drawing. As an example, the side edges of diaphragm 9 may be guided in U-shaped guide profiles. The auxiliary diaphragm is thus vertically displaceable in a direction parallel to the longitudinal extension of four photoelectric cells 10 to 13 disposed behind the diaphragm 9. The photoelectric cells 10–13 may thus be covered partially in accordance with the position of the auxiliary diaphragm 9. In the disposition shown in FIG. 1, wherein the auxiliary diaphragm 9 is arranged between wheel 5 and disc 6, this diaphragm should of course have a central vertically extending slit not shown, through which the shaft interconnecting parts 5 and 6 extends and which allows vertical displacement of the diaphragm relatively to the said shaft.

Each of the photoelectric cells 10 to 13 is interconnected with one of four similar circuits 14 to 17, whereof the circuit elements of circuits 14 and 17 only are shown in detail. Each of the circuits 14 to 17 has a miniature accumulator cell 18 connected with its terminals to two displaceable switch contacts 14a, 14b, 15a, 15b etc. The switch contacts 14a, 14b etc. may be connected to fixed switch contacts 14c and 14d respectively etc. The switch contacts 14c to 17c are directly connected to the minus terminals of the photoelectric cells 10 to 13, while the contacts 14d to 17d are each connected to the positive terminals of the cells 10 to 13 through a resistor 19 and a variable resistor 20. Voltage stabilization is obtained by the Zener diodes 21 series-connected with the resistors 19.

The governor motor 2 is connected to the output terminals of a bridge circuit of which the input terminals may be connected to an accumulator cell 26 through movable switch contacts 22 and 23 and fixed switch contacts 24 and 25. Similar circuits 27–30 are connected into each of the bridge branches, the circuit elements of such circuits being only shown for unit 27. Each unit comprises a pnp-switching transistor 31 directly coupled to an npn-amplifying transistor 32. The emitter and collector of the transistors 32 are connected to the collector and base respectively of the switching transistors 31. The base and emitter of each transistor 32 is connected with one of the pairs of conductors interconnecting one of the photoelectric cells 10–13 with one of the circuits 14–17, whereby the base of transistor 32 of the diagonally opposite circuits 27 and 30 is connected to the positive terminal of the associated photoelectric cells, whereas the base of the transistors 32 of the other diagonally opposite circuits 28 and 29 is connected to the negative terminal of the associated photoelectric cell.

FIG. 1 illustrates the off position of the circuit, wherein all the switches are open. The diaphragm of the objective of the camera is fully open and the auxiliary diaphragm 9 is in its upper end position for which the photoelectric cells 10 to 13 are completely exposed to illumination. Immediately prior to exposure of the film all the switches are closed by means described below. Each of the photoelectric cells 10 to 13 is thereby connected into a series circuit together with one of the miniature cells 18, and no voltage difference exists between the conductors of each pair of conductors interconnecting one of the cells 10–13 with one of the circuits 14–17 when the voltage drops in the cells 10–13 are equal to the voltages of the circuits 14–17. The elements and circuits are so adjusted that no voltage difference will occur when the already adjusted opening of the diaphragm 1 is correct for the existing illumination. Under these circumstances no voltage is applied between the base and emitter of all amplifying transistors 32 so that only very small rest currents will flow in such transistors and in transistors 31. Further, since the same current flows in all circuits 27–30 the bridge is in balance condition so that no current flows in the motor 2. When the illumination is too high with reference to the adjusted diaphragm opening, the voltage produced by the photoelectric cells 10–13 exceeds the voltage of the circuits 14–17 so that voltage differences are set up in the pairs of interconnecting conductors connected to the transistors 32. As an example, a positive voltage appears at the base of transistor 32 of circuit 27 relatively to the emitter potential of this transistor so that this transistor and the switching transistor 31 coupled therewith become conducting. The same conditions occur in the circuit 30. On the other hand a negative voltage appears at the base of transistor 32 of circuits 28 and 29 relatively to the emitter potential at such transistors, because the base of these transistors is connected to the negative terminal of the associated photoelectric cells 11 and 13 respectively. Transistors 32 and the switching transistors coupled therewith of circuits 28 and 29 are thus completely cut off. A current will now flow from cell 26 through the circuit 27, from the left to the right as seen in FIG. 1 through the motor 2 and the circuit 30 back to the cell 26. The motor 2 will thus rotate the toothed ring 4 and the diaphragm ring 1 in a direction for reducing the diaphragm opening. At the same time disc 6 is driven by the toothed wheel 5 in anticlockwise direction so that the slit 7 is rotated in the same direction relatively to the pin 8. Since the distance of the spiral-shaped slit 7 from the axis of disc 6 increases, the pin 8 and the auxiliary diaphragm 9 will be shifted downwardly during the above rotation of disc 6, whereby the photoelectric cells 10–13 are gradually covered by the diaphragm 9. Due to the covering of an increasing portion of the surface of the cells 10–13 the voltages produced in such cells decrease until a condition is attained wherein the voltage difference in the pairs of interconnecting conductors between photoelectric cells 10–13 and circuits 14–17 has decreased to zero. The bridge circuit will accordingly return to its balanced condition as explained above so that the motor 2 and diaphragms 1 and 9 will remain in their positions reached. When the illumination decreases again, voltage differences of opposite direction occur in the pairs of interconnecting conductors between photoelectric cells 10–13 and circuits 14–17. By these voltage differences of opposite polarity the circuits 27 and 30 are now cut off while the circuits 28 and 29 become conducting. A current of opposite direction will now flow through the motor 2 whereby the diaphragm 1 of the objective of the camera is opened and the disc 6 is rotated in clockwise direction. The auxiliary diaphragm 9 is moved upwardly as seen in FIG. 1 until the voltage of the photoelectric cells 10–13 which gradually increases due to the return motion of diaphragm 9, is sufficient to compensate the voltage of the circuits 14–17. The slit 7 has a form calibrated in such a way that for any possible illumination the balance condition of the circuit is obtained when the diaphragm 1 of the objective of the camera has reached the setting or opening which is proper for the existing illumination.

A similar calibration of the circuit may be obtained in another manner. As an example, the potentiometers 20 of all circuits 14–17 may be adjusted by the rotation of motor 2 in a predetermined relation or function with the diaphragm of the camera. In such a system the auxiliary diaphragm 9 and its actuating mechanism may be omitted.

In automatic cameras the diaphragm and the time of exposure are often commonly adjusted in accordance with a predetermined program or relation. In the embodiment shown in FIG. 1 an adjustable trigger for determining the duration of exposure may be coupled with the motor 2 for being adjusted together with the diaphragm of the objective according to a predetermined program or relation, whereby the duration of exposure and diaphragm opening are reduced with increasing illumination, both values being so adjusted that correct exposure of the film is obtained for any intensity of the illumination.

When free preselection of the duration of exposure is desired the potentiometers 20 may be adjusted in function of the preselection of duration of exposure, or the photoelectric cells 10–13 may be mounted on a support displaceable in the same direction as the auxiliary diaphragm 9, this support being adjusted to different positions related to different settings of the trigger or release of the camera. By such an adjustment of the potentiometers 20 or of the position of the photoelectric cells 10–13, a correction may be made for the effect of the time of exposure, in that for a predetermined illumination a larger diaphragm opening is adjusted for a short time of exposure than for a long time of exposure.

A measuring instrument 33 connected to the input terminals of the bridge circuit allows checking of the readiness for service of the device.

The static error of the device is in the order of 5%, that is, for a nominal diaphragm opening of 8, the diaphragm will be adjusted within a range of openings from 7.6 to 8.4.

The device may preferably be equipped with accumulator cells, and switch means may be provided allowing recharge of the accumulator cells. One embodiment of such switch means and recharging device is schematically shown, by way of example, in FIG. 2, wherein contacts shown in FIG. 1 are designated with similar reference numerals. The recharging circuit has terminals 37 and 38 adapted to be connected to the alternating current mains or to a direct current source, for instance a battery of photoelectric cells, in the polarity indicated in FIG. 2. According to the voltage applied at the terminals 37 and 38 direct voltages suitable for recharge of the accumulator cells are obtained at terminals or contacts 34 and 35 In the switch schematically illustrated the movable contacts 14a–17a, 14b–17b, 22 and 23 are mounted on a rotatable carrier 39 of insulating material. Of course such contacts are connected to the different accumulator cells as schematically shown in FIG. 1 by flexible conductors or preferably through slip rings not shown in FIG. 2 contacting each one of the above movable contacts and connected each to one terminal of an accumulator cell. The fixed switch contacts 14c–17c, 14d–17d, 24 and 25 are illustrated by circles. The switch further has contact segments 40 and 41 interconnected by a conductor not shown, and contact segments 42, 43 and 44 insulated from each other.

Figure 2:
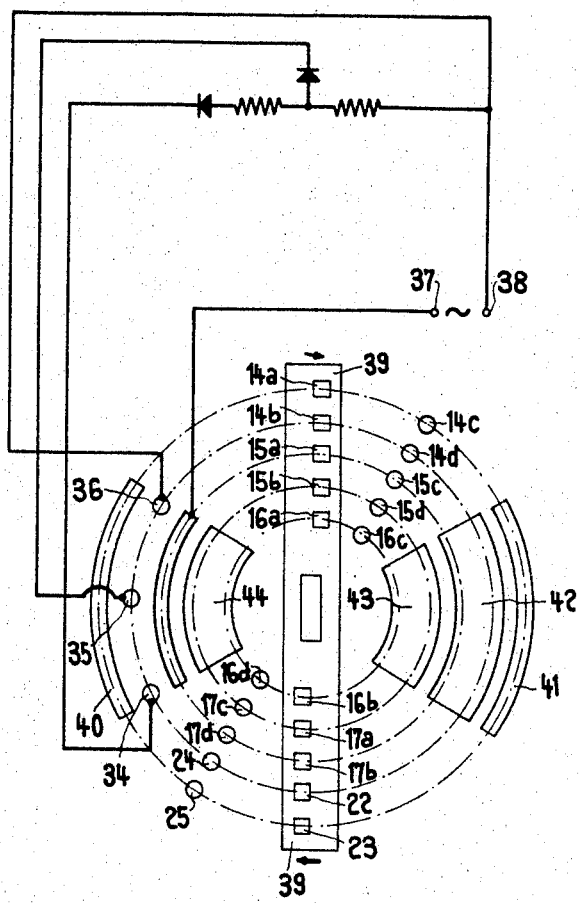
FIG. 2 is a circuit diagram of a charging device for the accumulator cells of the device.

In FIG. 2 the switch is shown in its off position wherein all movable contacts fixed on the rotatable carrier 39 are spaced from the fixed contacts. When the contact carrier 39 is rotated in clockwise direction in FIG. 2, the movable contacts or brushes will first contact the fixed contacts also shown in FIG. 1, whereby the device is connected for normal operation in the manner set out above. Upon further rotation of the contact carrier 39 in clockwise direction a position will be reached suitable for recharge of the accumulator cells with a relatively high A.C. voltage of 220 volts, when contacts 22 and 34 are closed. Charging of all accumulator cells occurs in a series circuit from terminal 38 through two resistors, the rectifier connected to terminal 34, this terminal 34, contact 22, the cell 26, contact 23, the contact segment 40, the contact segment 41, the contact 14a, the cell 18 of the circuit 14, the contact 14b, the contact segment 42, the contact 15a, the cell 18 of circuit 15, the contact 15b, segment 43, contact 16a, the cell 18 of circuit 16, contact 16b, segment 44, contact 17a, the cell 18 of circuit 17, contact 17b and the contact segment connected to terminal 37. For the next position of the contact carrier 39, wherein the contact 22 is connected to contact 35, a similar charging circuit is established with the difference that one resistor only and the rectifier connected to switch contact 35 is connected in the circuit. This position of the switch is suitable for recharge of the accumulator cells with an alternating voltage of 110 volts. The next position of the switch, wherein contact 22 is connected to contact 36, is suitable for recharge of the accumulator cells by means of a suitable D.C. current source, for instance a battery of photoelectric cells. The series connected accumulator cells are now directly connected to the terminals 37 and 38. The photoelectric cells of the recharging battery may be accommodated at the inner sides of a foldable sheet or pocket so that in unfolded state of the sheet a total surface of the photoelectric battery of 396 cm.² is obtained. When the accumulator cells are completely charged the device may be energized during 130 hours assuming that the motor 2 runs continuously. For normal operation, that is when motor 2 is only intermittently energized, the energy consumed during one hour may be recharged within 5 minutes from the mains or within 40 minutes by means of the photoelectric battery. After use of the device during 130 hours the accumulator cells may be recharged within 12 hours from the mains.

What we claim is:

1. An automatic diaphragm-setting device in a camera, comprising a reversible motor for setting the diaphragm, a bridge, circuit having input terminals and output terminals, said motor being connected to the output terminals of said bridge circuit, each branch of the bridge circuit including a transistor, a control circuit associated with each of said transistors, comprising each a light sensitive measuring element producing a direct voltage when illuminated, and a reference source producing a direct reference voltage, said measuring element and reference source of each control circuit being interconnected for control of the associated transistor by the difference of the voltage of the measuring element and of the voltage of the reference source.

2. A device according to claim 1, comprising photoelectric cells of elongated form constituting said measuring elements, said photoelectric cells being disposed parallel to each other, an auxiliary diaphragm adapted for translatory displacement in the longitudinal direction of the photoelectric cells, said auxiliary diaphragm being coupled with said motor for being adjusted in said longitudinal direction in accordance with the setting of the diaphragm of the camera.

3. A device according to claim 1, wherein each branch of the bridge comprises a switching transistor directly coupled with an amplifying transistor controlled by one of the said differential signals.

4. A device according to claim 3, wherein the emitter-collector circuit of the amplifying transistor is connected between the base and the collector of the switching transistor.

5. A device according to claim 4, wherein the said amplifying transistor is a npn-transistor and the said switching transistor is a pnp-transistor.

6. A device according to claim 1, comprising an accumulator cell for energizing the bridge circuit and four accumulator cells producing a reference or comparative voltage, and switch means adapted to disconnect all accumulator cells from the circuits energized by them and to connect such accumulator cells to a charging device.

7. A device according to claim 6, wherein said switch means comprise double pole switches for each of said accumulator cells, thereby allowing disconnection of both terminals of each accumulator cell and series connection of all accumulator cells for recharge thereof.

8. A device according to claim 6, comprising a common multiple pole commutator allowing connection of said accumulator cells for operation and recharge.

9. A device according to claim 6, comprising a battery of photoelectric cells, said switch means having a first recharging position for recharge of the accumulator cells from said battery of photoelectric cells and a second recharging position for recharge of the accumulator cells from the mains.

References Cited
UNITED STATES PATENTS

| | | | |
|---|---|---|---|
| 2,683,402 | 7/1954 | Bruck | 95—64 |
| 2,821,639 | 1/1958 | Bright et al. | 307—88.5 |
| 3,067,337 | 12/1962 | Bowman | 307—88.5 |
| 3,110,851 | 11/1963 | Plogstedt et al. | 318—28 |

FOREIGN PATENTS

| | | |
|---|---|---|
| 1,283,096 | 12/1961 | France. |
| 854,608 | 11/1960 | Great Britain. |
| 922,016 | 3/1963 | Great Britain. |

NORTON ANSHER, *Primary Examiner.*

J. F. PETERS, *Assistant Examiner.*